Patented Apr. 14, 1953

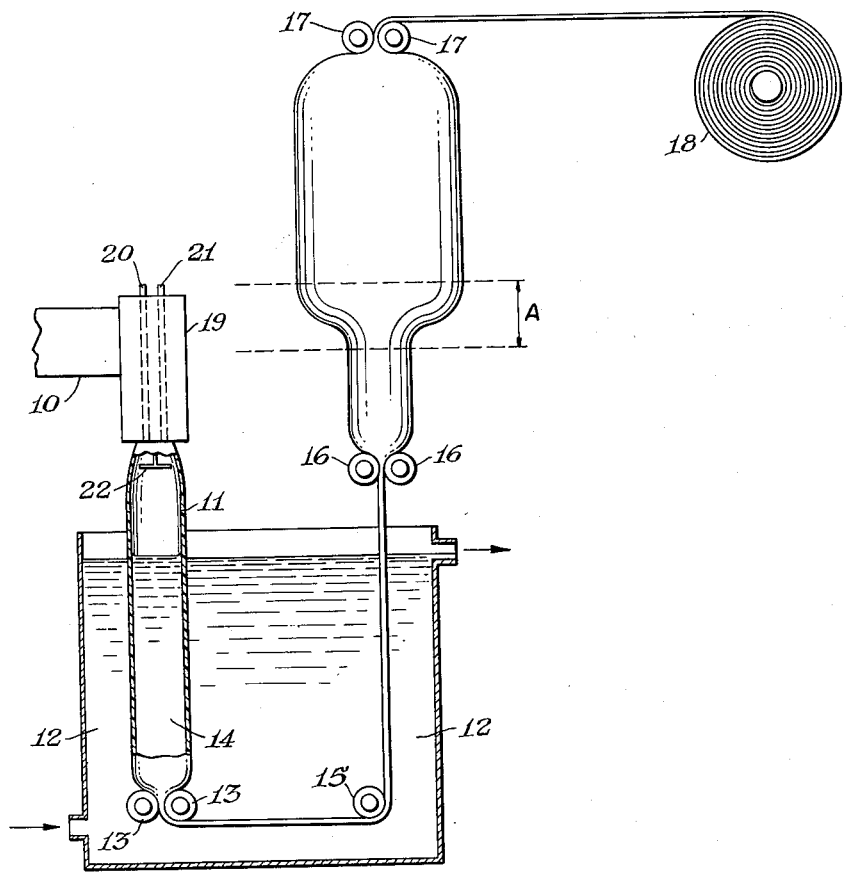

2,634,459

UNITED STATES PATENT OFFICE 2,634,459

PROCESS FOR THE MANUFACTURE OF CRYSTALLINE VINYLIDENE CHLORIDE POLYMER TUBING WHOSE WALLS DO NOT COHERE

Carroll R. Irons, Midland, Mich., assignor to The Dow Chemical Company, Midland, Mich., a corporation of Delaware Application February 3, 1951, Serial No. 209,254

3 Claims. (Cl. 18—57)

This invention relates to an improvement in the process of making films and tubes from normally crystalline vinylidene chloride polymers.

The principal method employed for producing film from normally crystalline polymers of vinylidene chloride has been described by W. T. Stephenson U. S. Patent No. 2,452,080. So far as is here pertinent, that method comprises fusion of the polymer or copolymer, extrusion thereof in tubular form downwardly into a bath of cold water to supercool it while maintaining a column of inert lubricating liquid in that portion of the freshly extruded tube which passes vertically downward into the said bath, conducting the supercooled tube out of the bath and between spaced pairs of pinch rolls, and inflating that portion of the tube between said pinch rolls with such an amount of air that the addition of more air results in no further increase in diameter of the tube but only in elongation of the "bubble" and migration of the stretching zone away from the second set and toward the first set of pinch rolls. Said method is applicable not only to the polymer of vinylidene chloride alone but also to those vinylidene chloride copolymers which are normally crystalline, as determined by X-ray diffraction studies. It applies to extrudable compositions of such normally crystalline polymers, whether plasticized or unplasticized. All such bodies are referred to herein as normally crystalline vinylidene chloride polymers.

One problem which has arisen from the use of the above-described prior method has been due to the tendency of the fully stretched and recrystallized film tube, which becomes flattened in passing through the second set of pinch rolls, to resist reopening to tubular form, due to coherence between opposed internal faces of the flattened tube. Since, for most uses of the film, it is necessary to open the tube prior to filling sections thereof with merchandise or prior to slitting it to form a single film sheet, it is desirable to avoid or overcome its resistance to being opened. The stated problem is particularly acute when handling films made from the copolymer of about 73 per cent vinylidene chloride and 27 per cent vinyl chloride, and is overcome by the hereinafter described invention even with such a film.

It has been proposed by K. G. Francis in U. S. Patent No. 2,476,140 to overcome this problem by placing a charge of finely powdered crystalline vinylidene chloride polymer, of composition similar to that of the film being produced, inside the thin tube in the section in which recrystallization and orientation of the supercooled polymer occurs. Such treatment results in a reduced tendency for the tube walls to cohere when the thin walled tube is flattened between the final pinch rolls and is wound onto a storage drum. It has the serious disadvantages, however, of requiring production to be interrupted whenever the supply of polymer powder is exhausted in the expanded part of the tube, and the powdered anti-sticking agent is easily brushed or worn off from the film surfaces, which may again become cohesive.

It is the principal object of the present invention to provide an improvement in the stated process which will yield the film tube in a readily opened form, i. e. one which will overcome the stated tendency for opposed internal walls of the flattened film tube to stick together. A related object is to provide a treatment for the internal walls of a tube of normally crystalline vinylidene chloride polymer, during the course of its manufacture, so that said tendency toward coherence is overcome. A further object is to provide such a treatment, wherein the agent employed to produce the desired result is one which will not interfere with future welding or heat-sealing operations carried out on such film, and will not weaken the resulting welds or seals.

It has now been found that better results are obtained, and much more conveniently, by dusting the hot plastic tube internally with an anti-sticking agent as the tube emerges from the extrusion die and before it has moved down to the level to which it is filled with oil and at which it enters the cold water bath. This is accomplished by introducing the dusting agent at a uniform rate, suspended in air or other gas, through a special inlet tube passing through the extrusion die, while allowing air to escape from the hot tube through relief ports in that die. When the dusting agent is introduced into the tube at this stage in its manufacture, at a rate to provide about 10 to 15 milligrams per 100 square centimeters of internal tube surface, based on the area of the final stretched and oriented film tube, the agent becomes at least partially embedded in the internal surface of the near-molten tube. The coating is found to be very uniform, with no visible streaks or bare spots, which faults are common to other methods of dusting the film. After the so heated tube has been supercooled and cold stretched it may be flattened and stored for long times, even under pressure, without any tendency for the tube walls to stick together.

When it is desired to open the tube, none of the prior difficulties are encountered. The two opposed surfaces readily fall apart, as there is no apparent static or other cohesive attraction between them. Very little of the dusting agent wears off from the film, and not all of it can be wiped from the film surface. Hence the uniform coating provided by this method produces a lasting benefit to the film.

The invention will be described with reference to the accompanying drawing, the single figure of which illustrates the present process of manufacturing internally dusted crystalline vinylidene chloride polymer film.

The polymer is extruded from an L-head extruder 10 at a temperature above the melting point of the polymer. A tube-forming die is used, and the resulting hot tube 11 drops a short distance through air into a water bath 12 wherein the polymer is supercooled although this distance may be varied widely depending on the polymer employed. The tube 11 is constricted between pinch rolls 13, and there is maintained in tube 11 above rolls 13 a column of oil 14 (or a composite column of oil on water) which extends to a level near the level of the surrounding supercooling bath 12, to keep tube walls apart until the tube is supercooled. The flattened tube is passed around guide roll 15 and thence out of bath 12 and between pinch rolls 16 and 17. Between these two sets of rolls stretching occurs as described in Stephenson Patent 2,452,080, and the flattened tubular film may be stored on drum 18. Die head 19 is provided with a tube 20 through which the supply of lubricating fluid 14 may be introduced or replenished. A second tube 21 passes through die 19, and an air-borne dusting agent is introduced into the nearly molten tube 11 in the space between the face of die 19 and the column of lubricant 14. The dusting agent is or may be deflected against the walls of the hot tube 11 by a small baffle plate 22 suspended beneath the center of the face of die 19. The air used to carry the dusting agent into the hot tube 11 is vented continuously through tube 20.

The dusting agent may be finely ground polymer, but much more effective agents are micropulverized mica or micropulverized starch. Mica may be used in film tubes intended for industrial applications, and starch may be used in film tubes destined for food wrapping purposes. The particular dusting agent employed is a matter of choice and is not of concern in the present invention. In addition to the ones suggested above, various other powdered antisticking agents may be used, including zinc stearate or talc, and there are other materials which are solids at the temperatures encountered in the hot, freshly extruded tube, which will occur to those skilled in the art.

I claim:

1. In a method of making film in tubular form from a normally crystalline vinylidene chloride polymer which comprises extruding the polymer in tubular form from a die downwardly into a cooling bath in which the tube is supercooled, constricted, and filled with a lubricating liquid from the point of constriction to a level near that of the bath, and thereafter is stretched to effect orientation, the improvement which consists in introducing, continuously and at a uniform rate, a finely divided solid antisticking agent, selected from the group consisting of micropulverized mica and micropulverized starch, suspended in a gas stream, into the space between the extrusion die and the lubricating liquid within the hot tube, while venting continuously the gaseous suspending agent, thereby to coat the internal walls of the tube with and to embed partially therein the solid anti-sticking agent.

2. The method as claimed in claim 1, wherein the anti-sticking agent is micropulverized mica.

3. The method as claimed in claim 1, wherein the anti-sticking agent is micropulverized starch.

CARROLL R. IRONS.

References Cited in the file of this patent

UNITED STATES PATENTS

| Number | Name | Date |
|---|---|---|
| 1,618,026 | Royle | Feb. 15, 1927 |
| 1,730,638 | Young | Oct. 8, 1929 |
| 1,797,183 | Wetmore et al. | Mar. 17, 1931 |
| 2,488,571 | Trull | Nov. 22, 1941 |
| 2,317,687 | Larchar | Apr. 27, 1943 |